United States Patent [19]
Larsson

[11] Patent Number: 6,003,950
[45] Date of Patent: Dec. 21, 1999

[54] DEVICE FOR VENTILATING VEHICLE CHAIRS

[75] Inventor: Stefan Gunnar Larsson, Göteborg, Sweden

[73] Assignee: Walinov AB, Linkoping, Sweden

[21] Appl. No.: 09/043,028

[22] PCT Filed: Sep. 12, 1996

[86] PCT No.: PCT/SE96/01135

§ 371 Date: Mar. 10, 1998

§ 102(e) Date: Mar. 10, 1998

[87] PCT Pub. No.: WO97/09908

PCT Pub. Date: Mar. 20, 1997

[30] Foreign Application Priority Data

Sep. 14, 1995 [SE] Sweden ................................. 9503184

[51] Int. Cl.⁶ ..................................................... A47C 7/74
[52] U.S. Cl. .............................. 297/452.42; 297/180.14; 297/180.13
[58] Field of Search .................... 297/452.42, 452.43, 297/180.13, 180.14, 180.11, 180.16, 452.44, 452.45

[56] References Cited

U.S. PATENT DOCUMENTS

| 2,782,834 | 2/1957 | Vigo | 297/180.14 |
| 4,259,896 | 4/1981 | Hayashi et al. | 297/180.14 |
| 4,413,857 | 11/1983 | Hayashi | 297/180.13 |
| 4,671,567 | 6/1987 | Frobose | 297/452.42 |
| 4,946,220 | 8/1990 | Wyon | 297/180.13 |
| 5,403,065 | 4/1995 | Callerio | 297/180.14 |

Primary Examiner—Anthony D. Barfield
Attorney, Agent, or Firm—Nilles & Nilles SC

[57] ABSTRACT

A device for ventilating chairs which has an air-permeable covering portion (13, 14) which is applied over the filling (7) of the chair, an insert (15; 59) located between the covering portion and the filling and a suction device (26) which through a system of suction openings in the covering (57, 60) and the insert (40, 56) evacuates the ventilating air. The insert (15) is joined with the covering (9) of the chair to an integrated unit, which is tightened against the filling (7), and from the insert (15) there extends a duct connection (40, 25) tightly separated from the filling, which leads the air to the suction device.

17 Claims, 4 Drawing Sheets

DEVICE FOR VENTILATING VEHICLE CHAIRS

BACKGROUND OF THE INVENTION

1. Field of the Invention

The present invention relates to a device for ventilating a chair, which is of the kind comprising a cushion with a shaping filling that carries up and supports a person sitting in the chair and preferably consists of moulded plastic foam or similar material, a covering which is applied over the filling and over an insert located under the covering, the insert comprising a material which is permeable to air and preferably elastic and fibrous and being limited by a layer of airtight material. The ventilating device comprises a covering portion which at least partly is permeable to air and has such a surface extension that it is touched and loaded by the body of the person sitting in the chair, and a suction device which communicates with the inside of the covering portion and through a system of suction openings ventilates away the air that is drawn inwards through the cushion. The system of suction openings together with the air-permeable material of the insert, distributes the negative pressure produced by the suction device and thereby the ventilating flow of air.

The invention is specially intended for vehicle chairs, but shall not be limited hereto but can be applied generally in all kinds of sitting furniture.

2. Description of the Related Art

A ventilating device of the above-stated embodiment is known through Swedish patent 8703176-1 (Publ-No. 459.389). A layer of fibrous, air-permeable material located between the covering and the filling of the chair cushion is, according to the patent, inserted into an airtight bag which also encloses the plastic foam filling of the chair cushion. The bag is also shown containing a second fibrous layer located on the underside of the filling, where the bag has a connection for a suction duct.

OBJECTS AND SUMMARY OF THE INVENTION

The ventilating air shall therefore, according to the Swedish patent, be drawn right through all the parts of material of which the chair cushion is comprised, which irrevocably causes the device to work with a high flow resistance the major portion of which comes from the material enclosed by the bag, while the minor portion appears in the covering of the chair, which is said to consist preferably of woolen fabric. The high resistance that the suction device must overcome limits naturally the flow of air which in turn causes that the desired cooling effect on the body of the person sitting in the chair is not obtained. Briefly, the known device is characterized by a low efficiency, counted as the utilized suction effect in relation to the effect supplied to the suction device.

It is not possible nor desirable, especially in installations in vehicles, to compensate the poor cooling effect by choosing a bigger, more powerful suction device, which would give a sufficiently great ventilating flow of air, because that would give a high power consumption. A device of this kind must work continuously the whole time when the vehicle is driven, and therefore an increased load on its electric system must be avoided.

A valuable contribution to the development in this area which has been presented through the invention according to the above-mentioned patent is the steps disclosed therein to get a uniform distribution of the negative pressure on the inside of the air-permeable covering portion and thereby a uniform distribution of the flow of air through this covering portion. Such a step entails that the suction openings in said insert receiving the ventilating air from the covering are arranged in a special pattern. The suction openings in the seat part of the chair are positioned in a U-shape to give a good suction effect on the sides of the thighs and seat of the person sitting in the chair, while the openings in the insert of the backrest follow a line along the symmetry plane of the chair in order that sweating shall not occur on the person's back. As stated in the patent specification, this causes that the suction effect of the device is limited or concentrated to the surfaces of the covering which are touched by said body parts while a suction effect is avoided in places where it is not needed.

This arrangement will, however, not come to its full advantage in the known device due to its low efficiency, since the fact that a uniform distribution of the negative pressure and the flow of air and a suitable concentration of the suction effect do not improve the cooling effect, if the negative pressure inside the covering and the flow of air through the suction openings of the insert are insufficient.

The known device has also other inconveniences, particularly in installations in vehicles, due to the extensive contents of the "tight" bag. A cushion of a vehicle chair must be mechanically fastened in the carrying frame of the chair in which sheet-metal edges, screws and other protruding details facing the filling can hardly be avoided. Because the cushion and the bag move in the frame due to vibrations in the vehicle body and changes in load caused by the vehicle driver or passengers, there is an obvious risk that the sides and bottom of the bag are damaged, so that part of the air that shall ventilate the chair leaks in and moves through the filling to the suction device. Hereby, the cooling effect is naturally decreased.

Another inconvenience which also depends on the extensive insert in the known device is the mutual dependence between the various parts of the cushion that affects their design, manufacture and mounting. Due to the complex geometry of the filling used in modern cars to give a good comfort to the driver, it is difficult to make the surrounding layer fit this geometry and the frame of the chair. Modern car seats have furthermore mechanical fastening devices for the chair cushion which together with hooks fasten to the chair covering so that the latter is stretched downwards towards the frame and forms transverse and longitudinal folds, which also serve to give a characteristic design to the chair. To apply these hooks so that they do not cause leakage in the places where they pass through the "tight" bag constitutes a problem for the chair manufacturer. Because the filling shall be entirely covered by the bag it is furthermore difficult to arrange a tight connection in the bottom of the bag to the suction device, which must be done with the cushion in its place in the chair frame.

The present invention is an improvement of the device known through the patent SE 8703176-1 and an important object is to eliminate the above-described disadvantages. It is generally an object of the invention to give to the device the best possible efficiency, for which end the lowest total resistance for the ventilating air shall be sought.

While principally maintaining the above-stated advantage of the known device, which relates to the distribution of negative pressure and flow of air, it is a further kindred object to attempt to provide a device in which the major portion of the pressure drop appears in the suction openings while only a minor part of the pressure drop over the device emanates from the cushion material.

One additional object of the invention is to seek to eliminate the risk of leakage in the device so that, if possible, the whole flow of air to the suction device becomes effective and has a cooling effect on the body of the person sitting in the chair. The invention also aims at a device which is easy to build into a vehicle chair or in other sitting furniture. These purposes and objects are fulfilled in that the device according to the invention has been given the characteristics stated in the subsequent claims.

BRIEF DESCRIPTION OF THE DRAWINGS

The invention shall now be described in more detail with reference to the accompanying drawing. Hereby, as in the claims, certain expressions regarding position, such as "upper", "lower", "underside" and "at the bottom" which strictly apply to the device in the seat part, will for the sake of simplicity be used also for the device in the backrest with the same meaning as "front", "rear", "rear side" and "at the rear". When reading the claims and the text relating to FIG. 2 the reader should therefore also regard the section of the backrest as if seen vertically.

DESCRIPTION OF THE PREFERRED EMBODIMENTS

Figure 1:
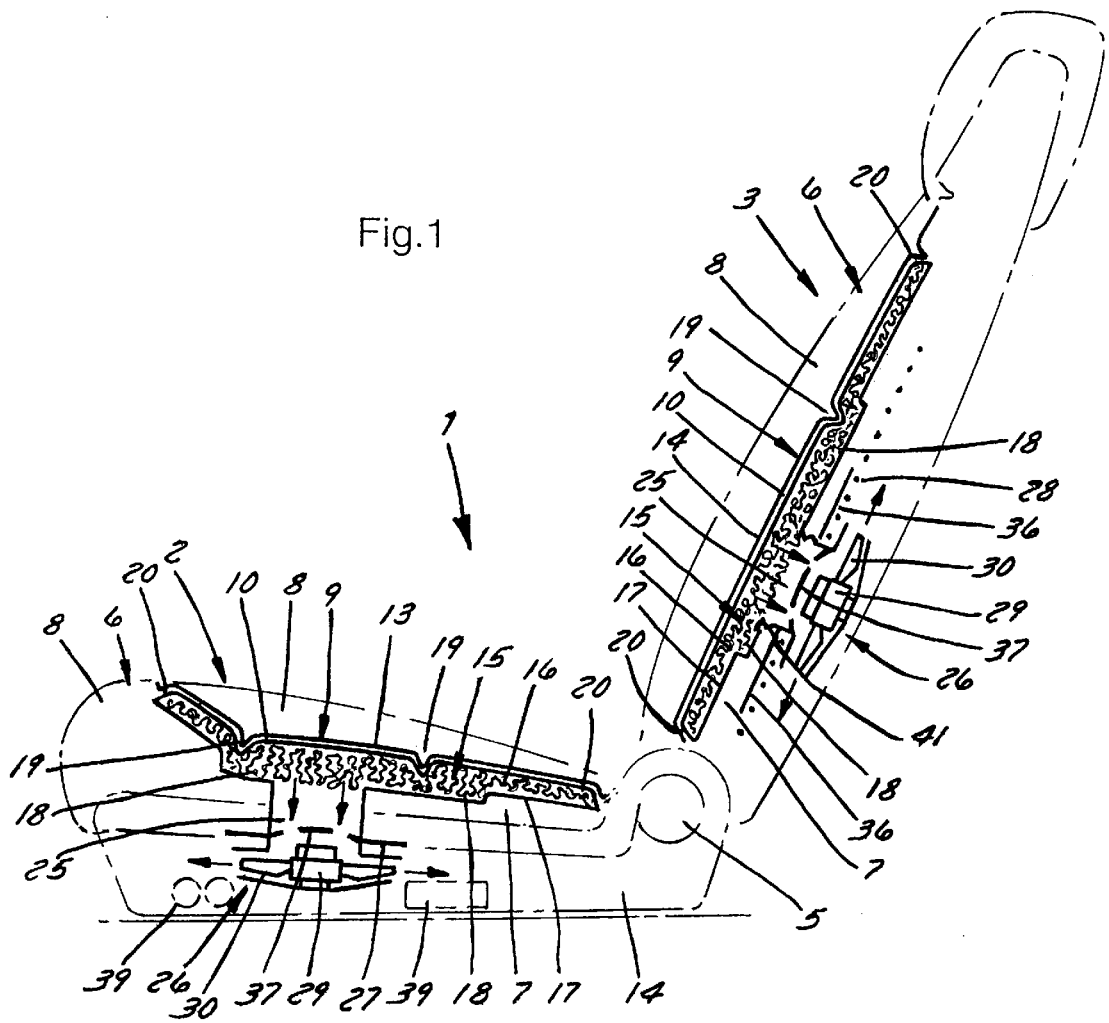
FIG. 1 is a side view of a vehicle chair, the seat part and backrest of which are provided with devices according to the invention, which are schematically shown in section.

To make the drawing clear, the parts in the device which are made of bedded material are shown with extremely exaggerated thickness.

In FIG. 1, the numeral 1 designates generally a ventilated vehicle chair, here shown as a front chair in a passenger car and comprising a seat part 2 and a backrest 3 which is attached to the chair frame 4 in a joint 5 so that the backrest can be set in different inclined positions.

By the expressions "vehicle chair" and "chair" here as well as in the claims it is meant other kinds of chairs and seats used in vehicles than the one shown here, such as back seats in cars, seats and chairs in buses and airplanes, seats and couches in railway cars and passenger ships and the armchair-like chairs that are used in for example lorries and in which the seat part and the backrest form a unit. Office chairs as well as other sitting furniture, which may require ventilation, are also included in the area of application. Even if the device according to the invention is shown and described here in only one kind of vehicle chair, the invention shall not be limited hereto but comprises applications in all kinds of chairs or seats which shall be possible to provide with ventilating devices of the kind that the invention relates to, in order to improve the comfort of a sitting person.

In the drawing, the numeral 6 is the chair cushion which comprises a filling 7 which usually is hollowed-out with elevated longitudinal sides 8 to give a good support to a person sitting in the chair. The filling can consist of molded foamed plastic or similar material which with a certain spring can carry up the sitting person. The chair cushion has furthermore an enclosing covering 9 whose external layer 10 is of leather, plastic-coated fabric or textile material and which within has a layer 11 of soft elastic material that promotes comfort and can consist of polyester fibres or perforated foamed plastic. A thin web with wires forming an electric heater 12 can also belong to the covering.

For the ventilation of the chair, in case the layer 10 consists of a tight material, it shall have a perforation on approximately rectangular covering portions 13, 14, which are limited by the sides 8 of the seat part and the backrest, respectively, and which are touched and loaded by the body of the sitting person, and for said purpose there is furthermore on the underside of these covering portions a plate-formed insert 15 having an air-permeable material 16, which preferably is fibrous and can consist of horsehair, coconut fibres or synthetic material. The insert furthermore comprises a layer 17 of an airtight material, for example PVC-coated polyamide, which in the embodiment in FIG. 2 like a bag encloses and limits the air-permeable material 16, so that the insert gets principally the same surface extension as the covering portions 13 and 14. On its underside the insert 15 has a thickening part 18, which as FIG. 1 shows extends from the front along the central plane of the chair past transverse folds 19 in the covering, and which serves to ensure that the insert despite the folds gets full air-permeability.

The insert 15 is so arranged that because of the surrounding edges 20 and the undersides 21, 22 of the insert, it fits into a recess in the filling 7 which forms supporting surfaces 23, 24 against which the layer 17 of the insert shall bear tightly. From the latter supporting surface there is a conducting connection, which according to the drawing can consist of a channel 25 extending from the lower layer of the insert to a suction device 26. This is preferably a fan of radial type, attached at the bottom of the seat part and in the backrest against a bottom plate 27 and a so-called pullmaflex wire-netting 28, respectively, or other carrying means in the frame of the vehicle chair.

Figure 2:
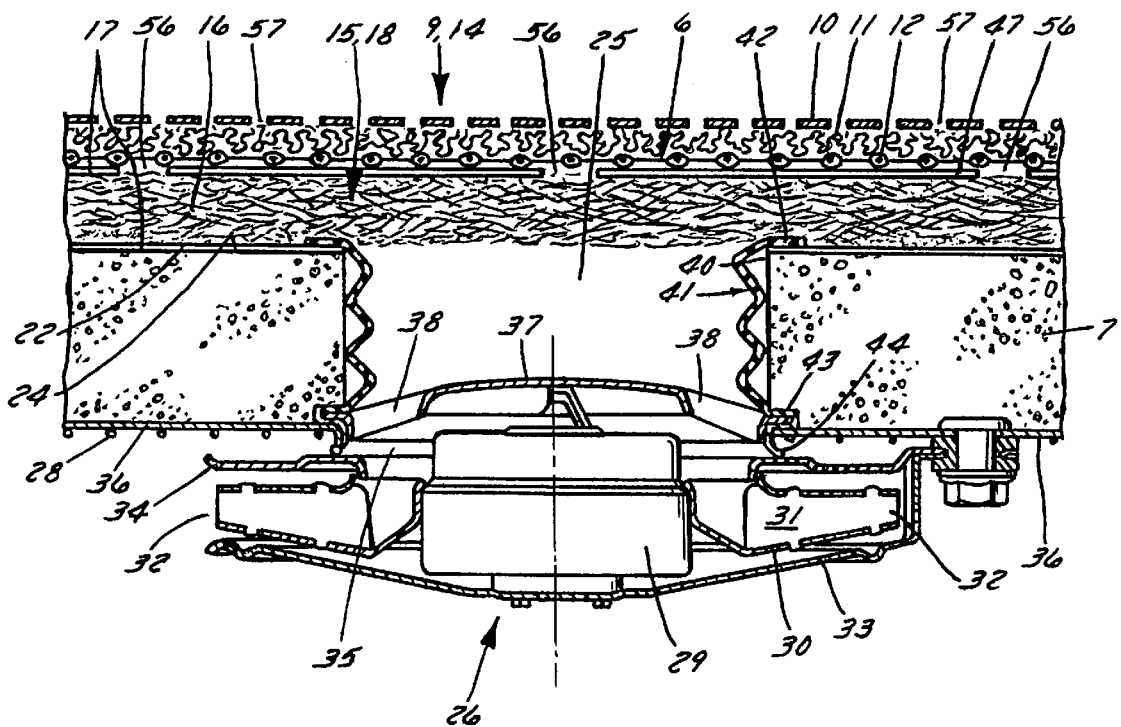
FIG. 2 is a cross-section of a portion of the backrest taken in its symmetry plane in the same way as the corresponding section in FIG. 1, but on a larger scale.

The suction device, whose construction is best seen in FIG. 2, has in its central part an electric motor 29 whose jacket is driving and carries a fan wheel 30. The wheel has a plurality of blades 31 attached between wheel plates which at the periphery form the outlet 32 of the fan, where the air that ventilates the vehicle chair can flow out freely in all directions.

The fan wheel is enclosed in a case comprised of a lower part 33 on which the motor 29 is attached, and an upper part 34 which together with the jacket of the motor defines the inlet 35 of the suction device. The case parts form attachments with which the fan can be mounted at the carrying means of the chair which in the figure is shown as a sheet-metal plate 36 combined with the pullmaflex wire-netting 28. Above the fan motor there is a protection plate 37 with openings 38 for the air which is drawn out of the insert 15 and flows to the fan through the channel 25.

The fan construction, which is no part of the present invention, is the object of a separate patent application filed simultaneously herewith, entitled "A fan device contained in a ventilated vehicle chair" with priority from Swedish patent application 9503183-7. Therein, the fan is described in more detail. Typical of the construction is its smallness in height and thereby the compactness in structure of the suction device 26 which makes it possible to install in the backrest without intruding on the space of the back-seat passengers, as well as in the seat part where the space under the chair cushion is very small because of the adjustment means (39 in FIG. 1) which exist in modern car seats for the adjustment of the seat part and backrest.

An alternative to the just described suction device with two separately working fans built into the chair is a single fan mutual for the seat part and the backrest, which can be located in the seat part. Here, the conducting connection to the fan comprises a suction duct which extends from the backrest via the rear portion of the seat part to the mutual fan, so that in its inlet it will receive all the air drawn out of the two inserts 15. The suction duct is suitably formed as a hose, which is tightly inserted at an opening in the lower airtight-material layer 17 of the backrest, preferably in the thickening part 18 of the insert. The hose can be invisibly inserted into the filling of the backrest and the seat part and be supported by the carrying means 28 and 27 unto the fan unit, where the hose can end in the channel 25 of the seat part, alternatively be directly connected to the inlet 35 of the fan.

A hose duct to a mutual fan can also come in use in the event a seat part or a backrest has two or more covering portions separate from each other, which do not have a single mutual air-permeable insert, but have separate inserts or inserted portions only one of which has its air-permeable material standing in connection with the fan in accordance with the example of embodiment in the drawing. For the adjacent covering portion or portions and their inserts or inserted portions, which can be separated through a fold deep in the cushion, a conducting connection or connections can be arranged to the inlet of the fan by means of a hose, which is connected in the same way as described above for a backrest.

In another alternative application, which is suitable for vehicles or craft with a plurality of passanger chairs or seats, such as buses or airplanes, each chair or seat can be connected to a suction device which is one for the whole vehicle, wherein the fan unit is suitably located in a luggage space. Such a location can also be preferred for an application of the invention in the backseats of cars. Also in big luxuriously equipped cars the space under the back seat is so narrow that a suction device is difficult to install, and a good solution is therefore to lead the ventilating air in a duct, in a way known per se, to a fan mounted in the luggage boot.

Irrespective of what type and what mode of installation of the suction device it is a strong desire that its suction effect result in sufficiently high values of negative pressure and flow of air at the top of the inserts 15. According to an important characteristic of the invention the inserts therefore exclusively comprise a material with an air-permeability which is considerably greater than the foamed plastic in the filling 7, and furthermore it is essential that the connection between the insert and the suction device is without loss, if possible, with no leaks and with a low flow resistance. It shall therefore be possible to draw the air directly out of the permeable material 16 in the insert 15 and via conducting means 40 in the underside of the layer 17 to lead it further through the channel 25.

To prevent air from leaking to the suction device through pores in the filling material 7, the device in FIG. 2 according to a special characteristic of the invention has a bellows 41 of rubber or other elastic material which forms a tight wall in the channel 25. The bellows starts at the supporting surface 24 on the filling against which bears the tight layer 17 of the insert so that it overlaps and seals the upper flange 42 of the bellows, and extends down to the inlet 35 of the suction device where the bellows forms partly a double profile 43 extending around an edge on the protection plate 37, which profile seals against the sheet-metal plate 36, partly a downwardly directed lip 44 which prevents air from leaking radially inwards to the inlet.

Figure 3:
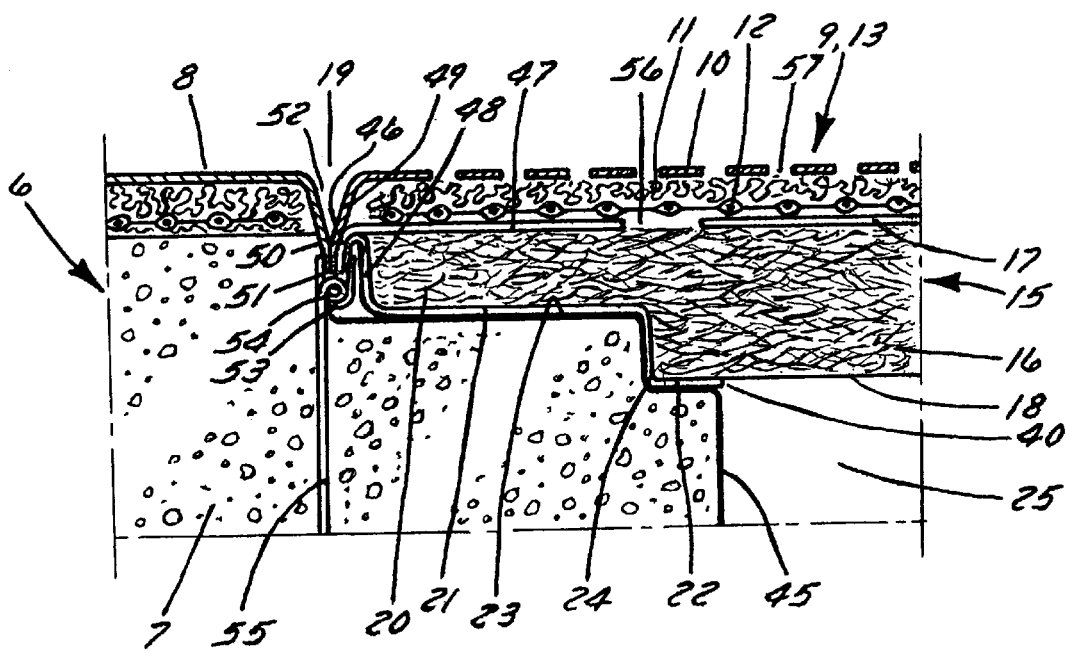
FIG. 3 is a cut-out of the device comprised in the seat part according to FIG. 1, also shown on a larger scale.

An alternative way of preventing leaks from the filling 7 is that, instead of the rubber bellows, the wall of the channel 25 and the supporting surfaces 23, 24 are provided with an airtight layer 45, see FIG. 3, which can be applied for example by means of spraying after the filling has been formed.

According to a primary characteristic of the invention, the covering 9 of the chair cushion and the insert 15 forms an integrated unit, which after its formation can be tightened against the filling 7. How this unit is achieved is evident from the cut-out in FIG. 3. The previously mentioned edges 20 on the insert has a lip 46 formed through the extension at the sides of the airtight layer 17, so that its upper side 47 as well as the edge portion 48 of the underside go past the air-permeable material 16 of the insert, the lip tightly sealing the edges of the insert on all four sides of the insert. The lip is also tightly connected to the external covering material which as the figure shows can be done in a way such that the layer 10 is cut out with surpluses 49, 50 coming from the above-mentioned covering portions 13 and 14 and from the sides 8, respectively, whereupon the ends of the lip and the surpluses are sewn, glued or welded together to a tight, strong seam 51. Alternatively, the edge portion 48 on the underside of the layer 17 can be made shorter than the extended upper side 47 and with a separate seam be attached to the upper side so that the lip only gets one airtight layer to be joined with the covering material. If preferred, the latter can be a single piece, which is folded double at the joining. By folding the covering parts, thus integrated, inwards to the filling 7, a groove 52 is formed which extends around the covering portions 13 and 14 and tightly separates these from the surrounding sides 8.

Inside the groove 52, a tunnel 53 of thin fabric can be attached, in which tunnel a steel wire 54 is placed so that with the aid of hooks 55 attached to the underside of the cushion the covering can be tightened downwards so that the insert 15 will have its undersides 21, 22 steadily bearing against the supporting surfaces 23, 24 located in the recess of the filling 7. It is realized that, through the above-described steps, leakage is prevented from the filling 7 to the insert 15 and to the channel 25.

The absence of leakage, together with the low flow resistance of the insert 15 owing to it exclusively containing air-permeable material, comprehends that the ventilating device gets an improved efficiency which makes itself known through increased values on negative pressure and flow of air on the inside of the covering, which values can amount to 350 Pa and 3 to 4 l/s, at which the power consumption of the fan motor becomes fully acceptable. The object stated in the introduction of utilizing more effectively the contribution of patent SE 8703176-1 relating to distribution of negative pressure and airflow is met herethrough.

For such a distribution, it is to be preferred that in the tight layer on the upper side 47 of the insert 15 facing the covering a number of suction openings 56 are made, which are suitably located according to the previously known patterns of holes, i.e. in U-shape on the seat part and in a row on the backrest. These suction openings, which can have a diameter of about 10 mm, form a ventilating system together with a larger number of small holes 57 in the external layer 10 of the covering, which holes can have a diameter of 1–2 mm (but shown exaggeratingly big in FIGS. 2 and 3) formed either in that the layer if consisting of a tight material is perforated over at least those surfaces which form support for the body of the sitting person, or through the general air-permeability that the layer has if it consists of a textile fabric. This system of suction openings, with the good values on negative pressure and airflow that characterize the device according to this invention, achieves that there is a principally even and good suction effect on said covering surfaces.

Figure 4:
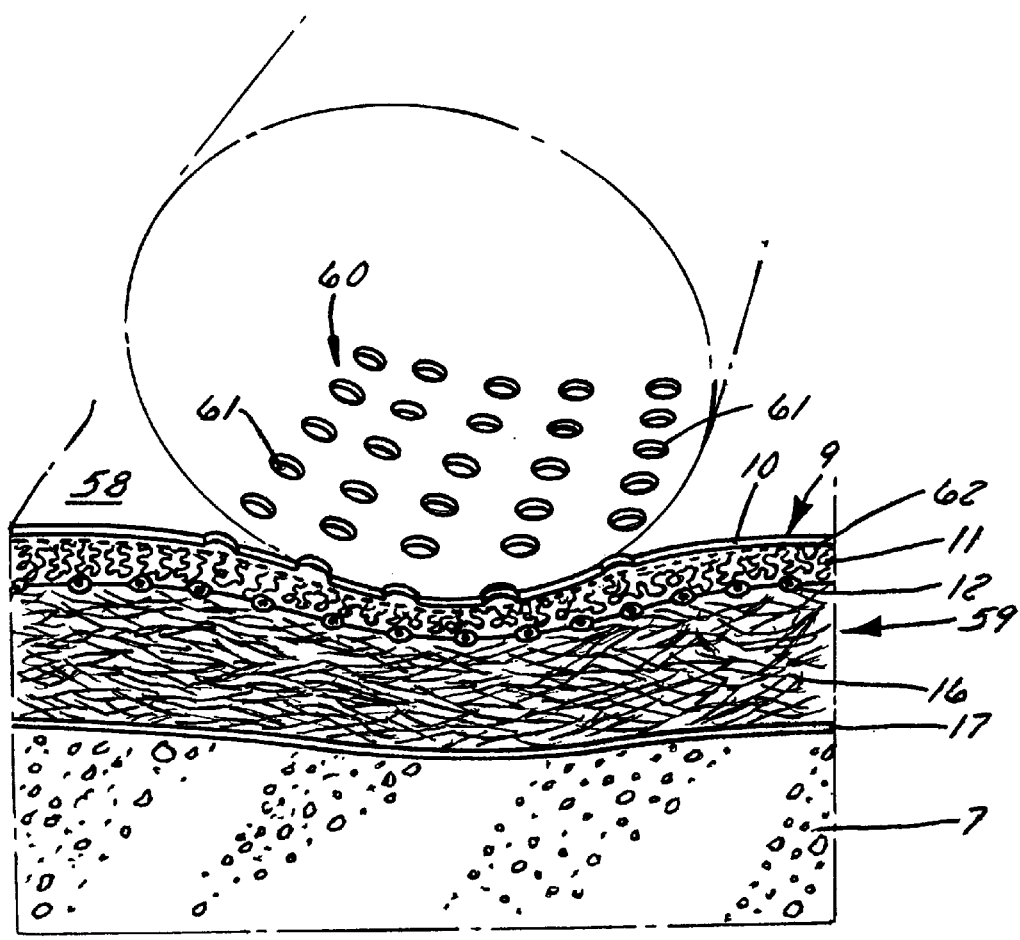
FIG. 4 is a cut-out seen in perspective of a portion of the device according to the invention in an alternative embodiment.

An equivalent but simpler and less expensive variant of the device of this invention is illustrated in FIG. 4 which shows a cut-out of a partly air-permeable covering portion 58. Here too, the chair cushion comprises an insert, designated by 59, which is located between the covering 9 and the filling 7. The insert has a tight layer 17, which here only separates the air-permeable material 16 from the filling, while this material has direct contact with the covering portion. The insert shall naturally communicate with a suction device.

Along the surfaces of the covering portion 58 which are known to be touched by the body parts of a sitting person, such as a thigh whose contours are outlined with dotted-dashed lines in the figure, there are areas with a perforation 60 comprising a great number of holes 61 which together constitute the system of suction openings of the device. To obtain the sought cooling effect on the body parts in question, it is preferable that the perforated areas follow the previously known pattern, i.e. they are executed with rows of holes forming a U-shape on the seat part and with a linear location on the backrest. The perforation in the covering distributes hereby the negative pressure and thereby the ventilating flow of air in the same way as described above with reference to FIGS. 2–3, i.e. the suction effect is concentrated to the surfaces from which heat and humidity shall be removed. In case the comfort material 11 included in the covering is a bright colour which would be very visible through the suction openings 60, it may be suitable for aesthetical reasons to apply a thin, darkly couloured air-permeable web 62, for example of nylon, on the inside of the layer 10.

I claim:

1. A ventilated chair comprising:
   a cushion with a shaped filling which is capable of carrying and supporting a person sitting in the chair,
   a covering applied over the filling and over an insert located inside the covering, which insert is of an air-permeable elastic-material which is limited by a layer of airtight material,
   and a ventilating device comprising 1) a portion of said covering which is air-permeable over at least a portion thereof and which has such a surface extension that it can be touched and loaded by the body of a person sitting in the chair, and 2) a suction device that communicates with the inside of said covering portion and that, through a system of suction openings, is configured to ventilate away air that is drawn inwards through the cushion, wherein the insert has a surface extension of about the same size as said covering portion, and wherein the airtight layer of the insert is edge-wise joined with the covering to form an integrated unit, which is tightened against supporting surfaces located interiorly of the filling, and further comprising duct means, located in the filling and extending from an underside of the insert, for leading the ventilating flow of air coming out of the insert towards the suction device, wherein the insert and the duct means are sufficiently airtight to at least substantially prevent air from outside from leaking to the suction device.

2. A ventilated chair according to claim 1, wherein the underside of the insert as well as an upper side of the insert facing the covering portion are covered by the airtight layer, and wherein the system of suction openings includes perforations formed in an upper side of the airtight layer.

3. A ventilated chair according to claim 1, wherein the underside of the insert is covered by the airtight layer and an upper side of the insert bears directly against the covering portion, and wherein the covering portion has perforations constituting the system of suction openings.

4. A ventilated chair according to claim 1, wherein edges of the insert comprise a lip which is formed from the airtight layer and which extends around and past the air-permeable material of the insert, wherein the lip and an additional portion of the covering that is located along the edges of the insert and that is included in both the covering portion and a surrounding covering are folded inwards against one of the supporting surfaces on the filling to form a groove around the covering portion, and wherein the lip, the surrounding covering and the covering portions are joined to one another at a bottom of the groove.

5. A ventilated chair according to claim 4, further comprising a metal wire that is located at the bottom of the groove and that hooks the integrated unit to a frame of the chair.

6. A ventilated chair according to claim 1, wherein said duct means is separated from the filling by airtight wall material, said wall material forming a tight transition to an underside of the airtight layer of the insert.

7. A ventilated chair according to claim 6, wherein the underside of the insert has a thickening part which extends along a central plane of the chair and which bridges the duct means and contains a channel opening which is connected to the wall material and which maintains the air-permeability of the insert despite folds in the covering portion that compress the insert.

8. A ventilated chair according to claim 1, wherein said chair comprises a vehicle seat.

9. A ventilated chair comprising:
   (A) a cushion including
      (1) a shaping filling,
      (2) a covering which overlies said filling, at least a portion of said covering being air-permeable,
      (3) an air-permeable insert disposed between said filling and said covering,
      (4) supporting surfaces located within said filling, and
      (5) a layer of airtight material located between said insert and said filling; and
   (B) a ventilating device including
      (1) a suction device, and
      (2) at least one airtight duct which is located, at least in part, in said filling and which extends from an underside of said insert to an inlet of said suction device, wherein
         a plurality of suction openings are formed within said chair to provide an airflow path leading from said portion of said covering, through said insert, and into said duct, wherein
         said insert has a surface extension which is of about the same size as said covering and which is joined edgewise, via said layer of airtight material, with said covering to form an integrated unit, and wherein
         said integrated unit is tightened against said supporting surfaces.

10. A ventilated chair according to claim 9, wherein said underside of said insert and an upper side of said insert facing said covering are covered by said layer of airtight material, and wherein said suction openings include perforations formed in an upper side of said layer of airtight material.

11. A ventilated chair according to claim 9, wherein said underside of said insert is covered by said layer of airtight material and an upper side of said insert bears directly against said covering, and wherein said portion of said covering has perforations constituting said suction openings.

12. A ventilated chair according to claim 9, wherein edges of said insert comprise a lip which is formed from said layer of airtight material and which extends around and past said insert, wherein said lip and an additional portion of said covering that is located along said edges of said insert and that is included in both said covering and a surrounding covering are folded inwards against one of said supporting surfaces on said filling to form a groove, and wherein said lip, said covering, said surrounding covering and said additional covering portion, are joined to one another at a bottom of said groove.

13. A ventilated chair according to claim 12, further comprising a metal wire that is located at said bottom of said groove and that hooks said integrated unit to a frame of said chair.

14. A ventilated chair according to claim 9, further comprising an airtight wall material which separates said duct from said filling and which forms a tight transition to an underside of said layer of airtight material.

15. A ventilated chair according to claim 14, wherein said airtight wall material is one of a bellows and a layer on a wall of said duct.

16. A ventilated chair according to claim 14, wherein said underside of said insert has a thickening part which 1) extends along a central plane of said chair, 2) bridges said duct, and 3) contains a channel opening which communicates with said wall material and which maintains air-permeability of said insert despite folds in said covering that compress said insert.

17. A ventilated chair according to claim 9, wherein said chair comprises a vehicle seat.

* * * * *